United States Patent
Ward, Jr. et al.

(10) Patent No.: US 11,206,579 B1
(45) Date of Patent: Dec. 21, 2021

(54) DYNAMIC SCHEDULING FOR NETWORK DATA TRANSFERS

(75) Inventors: David John Ward, Jr., Seattle, WA (US); Gregory Evan Redman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1203 days.

(21) Appl. No.: 13/430,003

(22) Filed: Mar. 26, 2012

(51) Int. Cl.
*H04W 28/20* (2009.01)
*H04W 8/24* (2009.01)
*H04L 29/06* (2006.01)
*G06F 16/27* (2019.01)

(52) U.S. Cl.
CPC ............ *H04W 28/20* (2013.01); *H04W 8/24* (2013.01); *G06F 16/27* (2019.01); *H04L 69/16* (2013.01)

(58) Field of Classification Search
None
See application file for complete search history.

(56) References Cited

U.S. PATENT DOCUMENTS

| | | | |
|---|---|---|---|
| 5,692,174 A | 11/1997 | Bireley et al. | |
| 5,825,876 A * | 10/1998 | Peterson, Jr. | G06F 21/10 380/228 |
| 6,421,728 B1 | 7/2002 | Mohammed et al. | |
| 6,493,685 B1 | 12/2002 | Ensel et al. | |
| 7,099,914 B1 * | 8/2006 | Hartmann | H04L 67/02 707/E17.121 |
| 7,412,538 B1 | 8/2008 | Eytchison et al. | |
| 7,637,426 B1 | 12/2009 | Green | |
| 7,743,001 B1 | 6/2010 | Vermeulen et al. | |
| 7,768,920 B2 | 8/2010 | Goshen et al. | |
| 7,870,044 B2 | 1/2011 | Robertson | |
| 8,024,225 B1 | 9/2011 | Sirota et al. | |
| 8,055,493 B2 | 11/2011 | Rolia et al. | |
| 8,339,995 B2 * | 12/2012 | Wong et al. | 370/255 |

(Continued)

FOREIGN PATENT DOCUMENTS

EP    2337257 A1 *    6/2011    ........... H04L 1/0045

OTHER PUBLICATIONS

Salehin, K. M ; Rojas-Cessa, R, Combined methodology for measurement of available bandwidth and link capacity in wired packet networks, 2010, vol. 4 (2), p. 240-252.*

(Continued)

*Primary Examiner* — Isidora I Immanuel
(74) *Attorney, Agent, or Firm* — Robert C. Kowert; Kowert, Hood, Munyon, Rankin & Goetzel, P.C.

(57) ABSTRACT

Methods and apparatus for dynamic pricing and scheduling of network data transfers are disclosed. A system a plurality of network-accessible resources and a data transfer coordinator. In response to a client request for a network transfer of a data set, the coordinator determines, based at on a network-related metric of one or more resources, at least one time window during which a portion or all of the data set is transferable for a pricing rate below a threshold. The coordinator notifies the client of the time window and provides a duration-limited token authorizing data transfer during the window. The coordinator determines whether a network transmission of data on behalf of the client is valid based at least in part on a time at which the transmission is initiated and at least in part on a use of the token.

26 Claims, 11 Drawing Sheets

(56) References Cited

U.S. PATENT DOCUMENTS

| | | | |
|---|---|---|---|
| 8,595,191 | B2 | 11/2013 | Prahlad et al. |
| 8,615,584 | B2 | 12/2013 | Dawson et al. |
| 2003/0002862 | A1* | 1/2003 | Rodriguez ......... H04N 21/6433 386/234 |
| 2003/0028642 | A1 | 2/2003 | Agarwal et al. |
| 2003/0088482 | A1 | 5/2003 | Blumberg |
| 2003/0126196 | A1 | 7/2003 | Lagimonier et al. |
| 2003/0229529 | A1 | 12/2003 | Mui et al. |
| 2004/0030740 | A1 | 2/2004 | Stelting |
| 2004/0243430 | A1 | 12/2004 | Horstemeyer |
| 2006/0159014 | A1 | 7/2006 | Breiter et al. |
| 2006/0167809 | A1* | 7/2006 | Bhambri ............. G06Q 30/06 705/59 |
| 2007/0219837 | A1 | 9/2007 | Lu et al. |
| 2007/0266414 | A1* | 11/2007 | Kahn ................. H04N 21/2541 725/113 |
| 2008/0080396 | A1 | 4/2008 | Meijer et al. |
| 2008/0103848 | A1 | 5/2008 | Santos et al. |
| 2008/0167928 | A1 | 7/2008 | Cao et al. |
| 2008/0243666 | A1 | 10/2008 | Rowan |
| 2009/0049114 | A1 | 2/2009 | Faraj |
| 2009/0182598 | A1 | 7/2009 | An et al. |
| 2009/0276771 | A1 | 11/2009 | Nickolov et al. |
| 2009/0281952 | A1 | 11/2009 | Toffey et al. |
| 2009/0300635 | A1 | 12/2009 | Ferris |
| 2010/0010657 | A1 | 1/2010 | Do et al. |
| 2010/0050172 | A1 | 2/2010 | Ferris |
| 2010/0057872 | A1* | 3/2010 | Koons .................... H04L 51/14 709/206 |
| 2010/0070397 | A1 | 3/2010 | Hahn-Carlson et al. |
| 2010/0131624 | A1 | 5/2010 | Ferris |
| 2010/0131649 | A1 | 5/2010 | Ferris |
| 2010/0217865 | A1 | 8/2010 | Ferris |
| 2010/0241479 | A1 | 9/2010 | Chaushev |
| 2010/0306379 | A1 | 12/2010 | Ferris |
| 2011/0119104 | A1 | 5/2011 | Levine et al. |
| 2011/0131335 | A1 | 6/2011 | Spaltro et al. |
| 2011/0137805 | A1 | 6/2011 | Brookbanks et al. |
| 2011/0138050 | A1 | 6/2011 | Dawson et al. |
| 2011/0138051 | A1 | 6/2011 | Dawson et al. |
| 2011/0145094 | A1 | 6/2011 | Dawson et al. |
| 2011/0145392 | A1 | 6/2011 | Dawson et al. |
| 2011/0154353 | A1 | 6/2011 | Theroux et al. |
| 2011/0161964 | A1 | 6/2011 | Piazza et al. |
| 2011/0173038 | A1 | 7/2011 | Moon et al. |
| 2011/0173626 | A1 | 7/2011 | Chi et al. |
| 2011/0179132 | A1 | 7/2011 | Mayo et al. |
| 2011/0202657 | A1 | 8/2011 | Chang |
| 2011/0213691 | A1 | 9/2011 | Ferris et al. |
| 2011/0213712 | A1 | 9/2011 | Hadar et al. |
| 2011/0238458 | A1 | 9/2011 | Purcell et al. |
| 2011/0295986 | A1 | 12/2011 | Ferris et al. |
| 2011/0295998 | A1 | 12/2011 | Ferris |
| 2011/0296025 | A1 | 12/2011 | Lieblich et al. |
| 2012/0016721 | A1 | 1/2012 | Weinman |
| 2012/0131161 | A1 | 5/2012 | Ferris et al. |
| 2012/0159506 | A1 | 6/2012 | Barham et al. |
| 2012/0173725 | A1 | 7/2012 | Verma |
| 2013/0111027 | A1 | 5/2013 | Milojicic et al. |
| 2013/0173418 | A1 | 7/2013 | Goad et al. |
| 2013/0212279 | A1 | 8/2013 | Dutta et al. |
| 2013/0232252 | A1 | 9/2013 | Huang et al. |
| 2013/0238785 | A1 | 9/2013 | Hawk et al. |
| 2013/0246208 | A1 | 9/2013 | Jain et al. |

OTHER PUBLICATIONS

"Amazon EC2 Spot Instance," Amazon Web Services LLC, Downloaded Mar. 26, 2012, 11 pages.

"Amazon EC2 Instance Types," Amazon Web Services LLC, Downloaded Mar. 26, 2012, 5 pages.

"Amazon EC2 Reserved Instances," Amazon Web Services LLC, Downloaded Mar. 26, 2012, 6 pages.

"Amazon EC2 Instance Purchasing Options," Amazon Web Services LLC, Downloaded Mar. 26, 2012, 2 pages.

"Amazon EC2 Pricing," Amazon Web Services LLC, Downloaded Mar. 26, 2012, 8 pages.

U.S. Appl. No. 13/331,750, filed Dec. 20, 2011, Amazon Technologies, Inc., all pages.

Agarwal, Sharad, et al. "Volley: Automated Data Placement for Geo-Distributed Cloud Services." 2010, pp. 1-16.

Amazon Web Services, "Discussion Forums; Existing Connections Dropped Rudely when Instance Taken out of ELB", Eric Hammond, Feb. 25, 2011, pp. 1-4.

Amazon Web Services, "Amazon Elastic Compute Cloud (Amazon EC2)", Mar. 24, 2011, pp. 1-26.

Amazon Web Services, "Amazon EC2 Pricing", Feb. 28, 2011, pp. 1-13.

Amazon Web Services, "Amazon EC2 Spot Instances", Feb. 24, 2011, pp. 1-5.

Amazon Web Services, "Amazon CloudWatch", Feb. 24, 2011, pp. 1-5.

U.S. Appl. No. 13/535,720, filed Jun. 28, 2012, Matthew D. Klein, et al.

U.S. Appl. No. 13/535,715, filed Jun. 28, 2012, Matthew D. Klein, et al.

U.S. Appl. No. 13/535,707, filed Jun. 28, 2012, Matthew D. Klein, et al.

U.S. Appl. No. 13/535,725, filed Jun. 28, 2012, Matthew D. Klein, et al.

AWS Documentation, "Using Cluster Instances," downloaded from docs.amazonwebservices.com/AWSEC2/latest/UserGuide/using_cluster_computing.html on May 16, 2012, pp. 1-6.

Amazon Web Services: AWS Products & Solutions, "High Performance Computing (HPC) on AWS," downloaded from aws.amazon.com/hpc-applications/ on May 16, 2012, pp. 1-3.

Timo Schneider (personal website), "An Oblivious Routing Congestion Simulator," downloaded from perlplexity.org/Research/ORCS/ on May 16, 2012, pp. 1-8.

U.S. Appl. No. 13/431,379, filed Mar. 27, 2012, David John Ward, Jr.

U.S. Appl. No. 13/431,388, filed Mar. 27, 2012, David John Ward, Jr., et al.

U.S. Appl. No. 13/429,957, filed Mar. 26, 2012, David John Ward, Jr., et al.

U.S. Appl. No. 13/431,355, filed Mar. 27, 2012, David John Ward, Jr.

U.S. Appl. No. 13/429,985, filed Mar. 26, 2012, David John Ward, Jr., et al.

U.S. Appl. No. 13/431,348, filed Mar. 27, 2012, David John Ward, Jr.

U.S. Appl. No. 13/431,360, filed Mar. 27, 2012, David John Ward, Jr.

U.S. Appl. No. 13/431,393, filed Mar. 27, 2012, David John Ward, Jr.

U.S. Appl. No. 13/475,399, filed May 18, 2012, David John Ward, Jr.

U.S. Appl. No. 13/475,359, filed May 18, 2012, David John Ward, Jr.

U.S. Appl. No. 13/461,605, filed May 1, 2012, David John Ward, Jr., et al.

U.S. Appl. No. 13/476,828, filed May 21, 2012, David John Ward, Jr., et al.

U.S. Appl. No. 13/475,461, filed May 18, 2012, David John Ward, Jr., et al.

* cited by examiner

600

Transfer Request Page https://<website>.com/transferRequest

To help us generate the optimal transfer plan, please ← 603
provide as many details as you can below.

| Field | Value | |
|---|---|---|
| Transfer Description | [ ] | ← 605 |
| Data Transfer Source (e.g., URL, IP address, Instance ID) (required) | [ ] | ← 607 |
| Data Transfer Destination (e.g., URL, IP address, Instance ID, Group of instance IDs) | [ ] | ← 609 |
| Data Set Object Type (e.g. File, Directory) | File (default) | ← 611 |
| Total Data Set Size (GB) | [ ] | ← 613 |
| Maximum data transfer pricing rate (you can change this later) | $0.05 per Gigabyte (default) | ← 615 |
| Deadline for completing the transfer | None (default) | ← 617 |
| Preferred transfer initiation mechanism (e.g., installable agent, direct API calls) | Installable agent (Default) | ← 619 |
| Preferred notification mechanism (e.g., SNS, SQS) | Any (default) | ← 621 |
| Preferred data validation mechanism | Checksum (default) | ← 623 |
| Preferred encryption mechanism | None (default) | ← 625 |
| Parallelism preferences | Don't care (default) | ← 627 |
| How frequently do you want human-readable notifications? | Send me an email after every 1000GB, and when transfer completes (default) | ← 629 |

[ Next ] ← 631

*Figure 6*

DYNAMIC SCHEDULING FOR NETWORK DATA TRANSFERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many cloud-computing environments relying on the types of virtualized network-accessible systems described above, application data set sizes are increasing over time. The "big data" phenomenon is already resulting in some applications having to analyze and manage multi-terabytes or even petabytes of data. For example, large sensor-collected data sets for complex science projects in the fields of physics, astronomy or biology may have to be transferred from the sometimes distributed locations where they are generated to other locations where they can be analyzed. Similarly, operational data such as web click streams or social media interaction records may need to be transferred for offline analysis to destination servers different from the production servers where the data is gathered. Since many provider network operators charge clients for network bandwidth based on the amount of data transferred, the costs of data transfer may sometimes become prohibitive for these kinds of applications.

BRIEF DESCRIPTION OF THE DRAWINGS

FIG. 6 illustrates a portion of an example web-based interface that may be implemented to allow clients to submit network transfer requests, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing and implementing dynamic pricing and scheduling for data transfers to and from network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Figure 2:
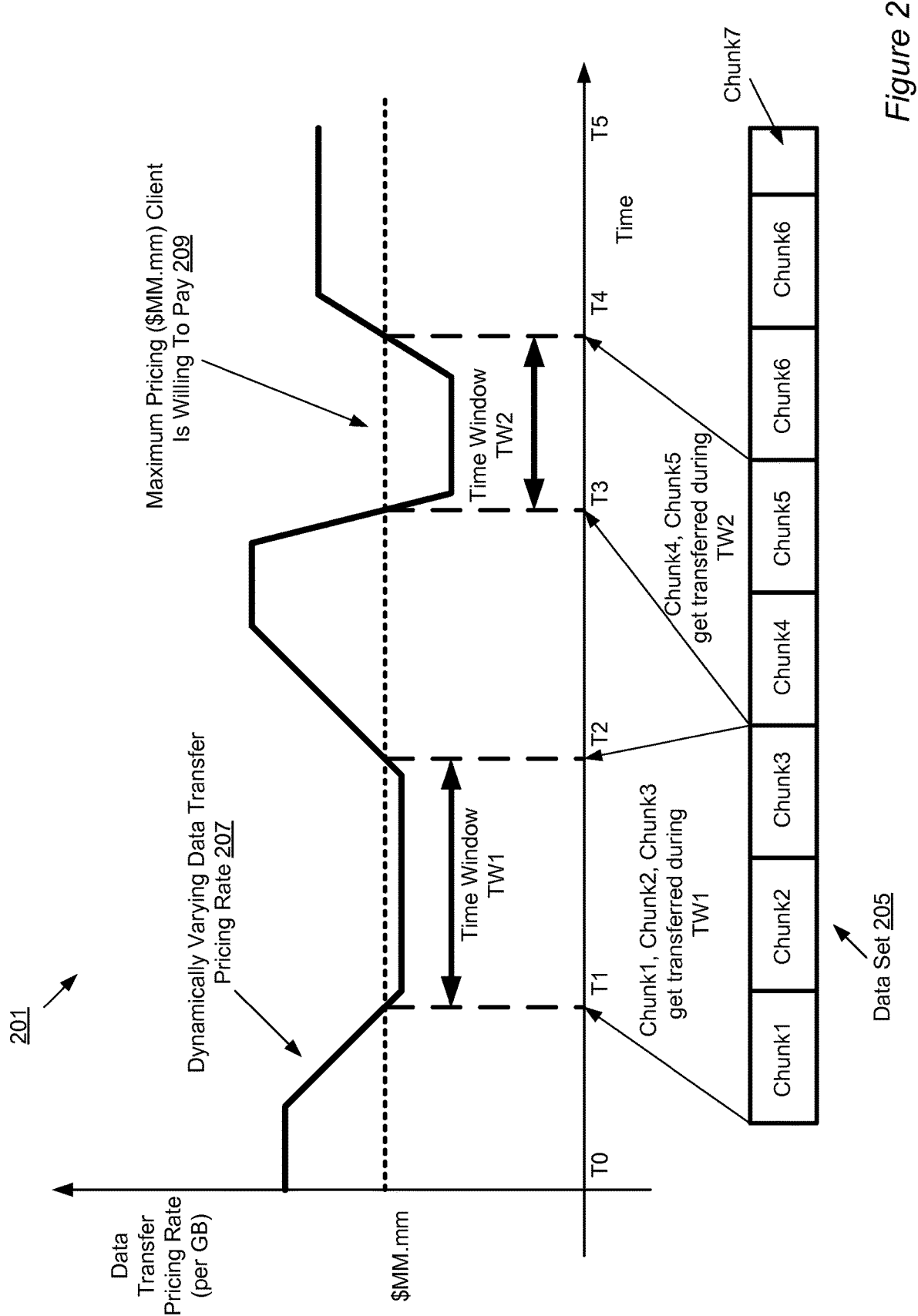
FIG. 2 illustrates an example of a data transfer that comprises multiple transfer operations during a plurality of time windows, according to at least one embodiment.

Many of the applications that are well suited for provider networks may involve analysis, generation and/or transmission of large amounts of data. For example, scientists at a research laboratory may collect data from thousands of sensors or instruments, and may wish to analyze the data using a group of compute resource instances of the provider network. In another example, web usage data such as click-streams, or social media traffic such as status updates, messages, photographs, and the like can quickly add up to terabytes or larger data sets. Biology, astronomy and physics, to name just a few disciplines, can also require analysis of potentially huge data sets that may need to be analyzed, used as inputs for simulations or other computations, and/or produced as outputs from simulations or other computations. Since provider networks may charge their clients for data transfer on a per-data-unit basis (e.g., X cents per gigabyte of data transferred), the total costs of transferring large data sets may soon become prohibitive. At the same time, at least in certain embodiments, the network links into, out of, and between various resources of the provider network may have periods of relatively low utilization. For example, in a given geographical zone or region of the provider network, network traffic may vary in at least somewhat predictable patterns over time: e.g., higher network bandwidth usage during weekdays than during weekends, and so on. Instead of, for example, charging a fixed pricing rate for bandwidth, the provider network operator may be able to charge a dynamic pricing rate such that the cost of data transfer varies based at least partly on demand and supply. Thus, for example, during periods in which the network utilization within a portion of the provider network is expected to be low, a lower data transfer price may be charged than during periods when the network utilization is expected to be high. In some embodiments, the provider network operator may for example implement a simple pricing scheme with a "standard" price and a "discount" price, where the discount price is valid only during periods of low expected bandwidth utilization. The boundaries of the low bandwidth utilization periods themselves may be fairly static in some cases (e.g., between midnight and 6 am in a particular time zone). In more complex implementations, the boundaries of the low bandwidth periods may themselves be dynamic, e.g., based on fine-grained network traffic measurements, on one day there may be a low utilization period from 6 am to 8 am, while on the next day the anticipated traffic patterns may result in the standard rather than the discount rate being applied for the 6 am-8 am time slot. In some cases, the time boundaries may themselves be static but the discount and/or standard prices may vary. And in some embodiments, both the time boundaries and the pricing may vary dynamically—FIG. 2 illustrates such an example. Budget-conscious clients may be able to partition their data sets, potentially with the help of software and/or agents provided by the network operator, to take advantage of such price fluctuations.

In order to cater to the needs of clients and applications that require large data set transfers, in some embodiments a provider network may include a data transfer coordinator (which may be referred to herein using the acronym "DTC"). The DTC may be operable to receive and respond to client requests for network transfer of potentially large data sets. In response to such a request, taking into account one or more metrics related to network traffic and/or other factors, the DTC may be able to identify one or more time windows during which at least a portion of the data set is transferable for a transfer price at or below a pricing threshold. For example, the client may in some embodiments indicate a bid, a maximum transfer rate (e.g., per gigabyte), or a maximum total price, that the client is willing to pay for the transfer of the data set, and the DTC may be able to identify a set of time windows during which the data can be transferred within the client's constraints. A variety of different data transfer pricing units or metrics may be used in different embodiments, by the DTC in specifying transfer rates and/or by the client in specifying budget-related constraints or bids. For example, in some embodiments the pricing may be based on average per-unit-data transfer rates such as cents per gigabyte or dollars per petabyte. In other embodiments, pricing may be based on the peak transfer rate rather than average, or a percentile based pricing rate may be used, where for example the data transfer price could depend on the $90^{th}$ or $95^{th}$ percentile of the peak transfer rate reached by the client during a specified duration. In some cases the pricing rate may be expressed based at least partly on the total amount of data transferred instead of, or in addition to, on the rate at which it is is transferred. If the DTC is able to find such time windows, in one embodiment the DTC may provide a notification of a particular time window to the client. A duration-limited token authorizing data transfer during that time window may also be provided to the client in some implementations. Thus, the client may be made aware of the start and end times of a time window in which a transfer of the data set (or a part of the data set) can be initiated by the client, and may also be provided with the required permissions in the form of the token. The client may then use the token when transmitting data from the desired source to the desired destination, at least one of which (the source, the destination, or both) may be a resource of the provider network. The DTC may monitor the data transmission attempt, and may validate the transmission based on a number of factors in various embodiments, including for example when the transfer was initiated (e.g., to ensure that the data transfer is attempted during the specified time window), whether the transfer was accompanied by an appropriate token, and so on. In scenarios where the data set is too large to be transferred completely within one time window, the process may be repeated for multiple time windows until the entire data set is transferred successfully. That is, the client may be notified of the next available time window and provided a token for that window; then the client may transfer the next portion of the remaining data, wait for the next notification, and so on. In some embodiments there may be delays between successive time periods, which (depending on the size of the data set, for example, and on operating conditions in the provider network) may be fairly long—e.g., hours, days or weeks. The data transfer pricing rate applied (i.e., charged to the client) may also vary for the different time windows during which the data set is transferred, e.g., based on the anticipated or current network utilization levels.

In one embodiment, the DTC may also inform the client of a maximum amount of data that can be transferred during a given time window. Such a limitation may be placed so that for example the DTC can predict, or maintain some control over, the bandwidth usage on the network links that may be involved in the data transfer so that unreasonable spikes in network traffic that may have detrimental performance impact for the requesting clients or other clients can be avoided. The maximum amount of data transferable may also be determined by the DTC at least partly on the price the client is willing to pay in some embodiments—if the client is willing to pay a higher transfer pricing rate, the maximum amount may be higher than for a lower rate. If the client attempts to transfer more data during the time window than the maximum amount specified, in some embodiments the DTC may invalidate or discard a portion of the data. For example, if 100 gigabytes were specified as the limit for a particular time window, and the client attempted to transfer 105 gigabytes, the last five gigabytes may be discarded by the DTC in one implementation. In some embodiments, in addition to an overall limit on the amount of data that can be transferred on behalf of a client during a particular time window, the DTC may also indicate a size limit for individual data transfers. For example, the DTC may inform the client that in order to transfer a total of ten gigabytes during a specified time window, at least ten separate data transfer operations should be used, with a maximum size of one gigabyte per transfer. Various different types of data transfer operations may be supported in different embodiments, depending on the particular protocols and/or standards in use—e.g., operations based on FTP (the File Transfer Protocol), FXP (File Exchange Protocol), FTPS (FTP over Secure Sockets Layer), FSP (File Service Protocol), FTAM (File Transfer Access and Management), SCP (Secure copy), SFTP (Simple File Transfer Protocol), HTTP (HyperText Transfer Protocol), HTTPS, WebDav, rcp (remote copy), rsync, and the like. The durations of successive time windows may not be the same in some embodiments, and the transfer price as well as the maximum transfer size and/or the units in which data may be transferred may also vary from one window to another.

The time windows and the transfer pricing rate may each be determined based on any combination of a number of different factors in various embodiments, For example, a time window may be determined based on expected or projected bandwidth utilization of one or more network links reachable from the source and/or destination resource. The expected or projected bandwidth utilization may be computed based on actual measurements of network usage over time, trend analysis, and the like. Similarly, the network transfer pricing rate may be based on demand and supply in some embodiments, e.g., based on measurements and/or projections of client demand for network transfers, and/or measurements or projections of available bandwidth capacity on the relevant set of network links or paths.

In one embodiment the DTC may implement one or more programmatic interfaces, such as a web-based interface, some other graphical user interface, one or more application programming interfaces (APIs), or command-line tools or interfaces, using which the client can submit network transfer requests and/or initiate data transfers. In some embodiments, the DTC may provide a data transfer agent that can be installed at a client device to help manage the data transfer operations. In one such embodiment, after such an agent is installed within the client network, for each time window of a data transfer, the agent may perform a set of preparatory steps for the data transfer(s) of that time window. For example, in accordance with data transfer size limitations, the agent may partition the data set, e.g., in the case of a large file, the agent may determine the starting offset within the file from which the next data transfer operation is to start, and the number of bytes of data to be included in the next transfer. The agent may also in some embodiments encrypt the partition, e.g., using any appropriate signing or encryption methodology. In one embodiment the agent may compute a checksum of the partition (and/or of the data set as a whole) usable later for verification that the partition transfer succeeded. In some implementations a de-duplication operation may be performed on the data set or individual partitions, and in other implementations the data may be compressed, either separately for each partition or each time window, or once for the entire data set. In some embodiments, agents may be implemented at both the sending and receiving entities for a data transfer: e.g., the sending agent may partition that data, compress it and encrypt it, while the receiving agent decrypts, uncompresses and recombines the data. The destination agent may also in some embodiments check the validity of the transfer, e.g., based on the token as well as on checksums or data signature mechanisms, and send acknowledgements for received data to the sender.

According to some embodiments, the DTC may support data transfers not just between client devices and resources of the provider network, but also between different resources of the provider network itself. For example, a client such as a video service provider may have set up video servers using one or more resources of the provider network in one geographical location, and may wish to transfer or copy at least a part of the video data to another location also forming part of the provider network. In such a case, respective resource sets of the provider network may serve as sources and destinations of a given network transfer request. Data transfers that have client network devices as sources or destinations may also be supported in such embodiments. In some environments, a client may wish to utilize network paths between the resources of the provider network to accomplish client-device-to-client-device data transfers. For example, in one scenario a client may need to transfer ten petabytes of data from one client data center in the USA to another client data center in Japan, and the DTC may be able to provide an efficient and economical way to do so which involves transferring the data to a local provider network resource in the USA, transferring the data to a provider network resource within Japan, and then transferring it from the Japanese resource to the client's Japanese data center.

In one embodiment, the token used for authorization may be encrypted, e.g. using a key-based encryption protocol, to reduce the probability that a malicious third party can misuse the token. Tokens may also have associated expiration times, which may in some implementations be extendable by the DTC. The expiration time of a token may be dependent on the end time of a time window during which the token is to be used in some implementations; in other implementations the expiration time may be settable such that the same token can be used for multiple time windows. If a client has not finished a data transfer during a time window for which a token was provided to the client, in some embodiments the DTC may be able to extend the validity of the token, e.g., based on the operational conditions such as bandwidth utilization of the affected portions of the network, current transfer pricing rates, and so on. In some implementations, the token for a given partition of data may be sent to the destination or to the DTC in a separate communication than the data itself.

The notification mechanism to be used to notify the client when a time window becomes available may be selectable by the client in some embodiments, e.g., from one among a set of supported notification mechanisms made accessible to the client via a programmatic interface implemented by the DTC. As noted above, the DTC may also implement a programmatic interface to initiate the data transfers for the various time windows in some embodiments. In one embodiment, portions of the data set may be transferable in parallel. For example, the DTC may set up N parallel data transfer streams for a given time window, and ensure that the data received via the various streams is collated/collected appropriately at the destination. Special parallel transfer tokens may be provided, e.g., one for each stream, in such embodiments. The number of parallel streams may change from one time window to another in some cases, e.g., depending on the current bandwidth usage in the provider network.

Example System Environment

Figure 1:
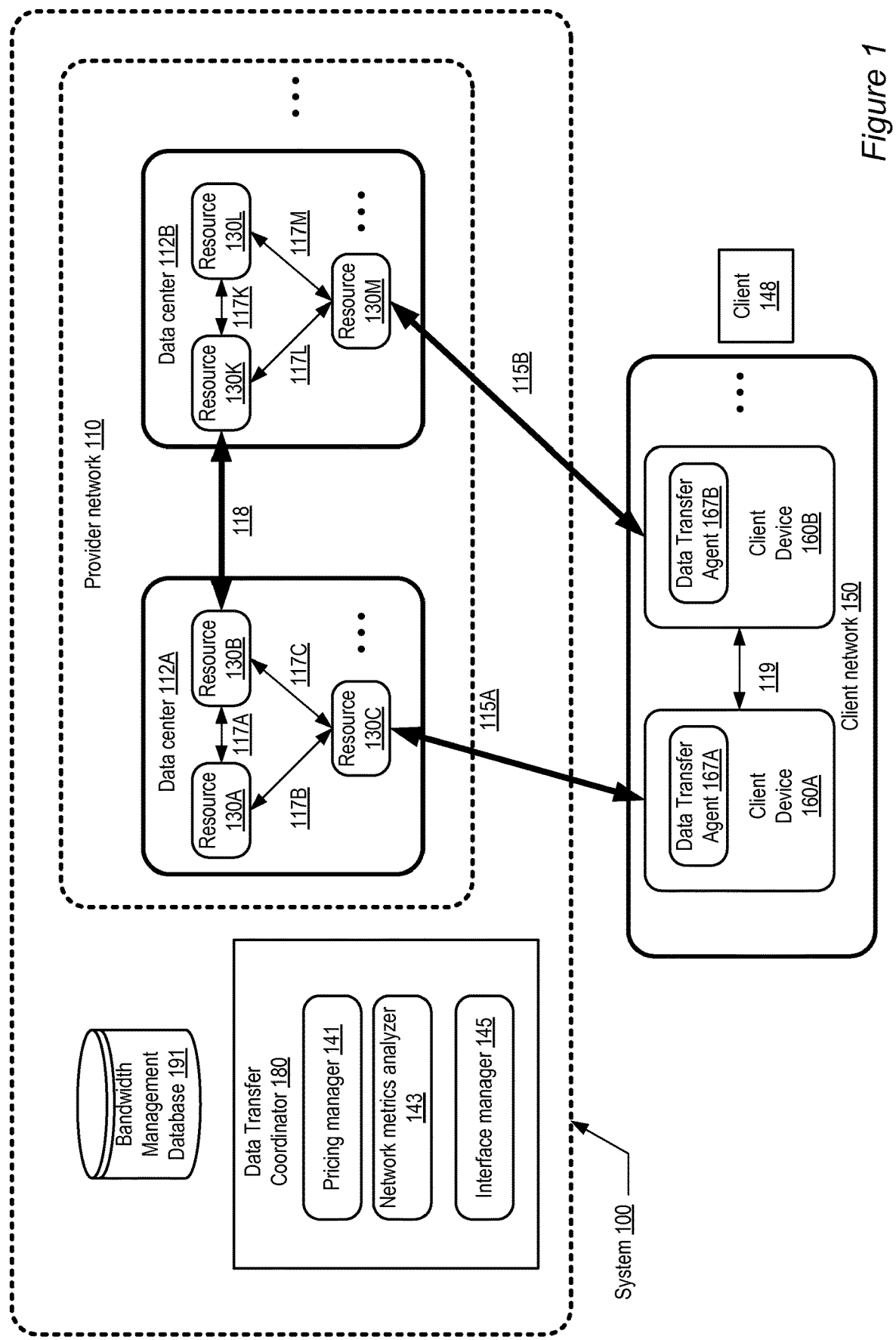
FIG. 1 illustrates an example system environment, according to at least some embodiments.

FIG. 1 illustrates an example system environment, according to at least some embodiments. The system 100 includes a provider network 110 comprising a plurality of geographical locations such as data centers 112A and 112B, as well as a data transfer coordinator (DTC) 180. Each data center 112 may include a plurality of network-accessible resources 130, such as resources 130A, 130B and 130C in data center 112A, and resources 130K, 130L and 130M in data center 112B. The resources 130 within a data center may be linked to each other via a plurality of network paths such as paths 117A, 117B and 117C in data center 112A, and paths 117K, 117L, and 117M in data center 112B. The data centers themselves may be linked via inter-data-center network paths such as path 118. Each network path 117 and 118 may in turn comprise a number of different physical and/or logical network links, and at least some of the paths may include network devices such as routers, gateways, switches and the like that are not shown in FIG. 1. In addition to the inter-resource paths 117 and the inter-data-center paths 118, the provider network may include various other network paths, e.g., paths that allow communication between client networks and the data center devices (such as paths 115A and 115B), between clients and the DTC 180, between the DTC and the resources 130, and between the DTC and a bandwidth management database 191. A client network 150 may comprise multiple client devices 160 (potentially distributed across multiple client data centers or other client premises) connected via client-side network paths 119 in some embodiments. Each of the resources 130, the client devices 160, and/or the DTC 180 may comprise any desired combination of computing devices such as general-purpose or special purpose computing systems, storage devices, network devices and the like in various embodiments.

In various embodiments, a client 148 may wish to transfer a data set, either between a client device 160 (such as client devices 160A or 160B) and a resource 130 (as indicated by the paths labeled 115A and 115B), or between two sets of resources 130. The client may send a network transfer request to the DTC 180, indicating for example the source and desired destination of the data transfer, identification information for the data set, the size of the data set, a bid or budget constraint for the data transfer, and so on. In response to receiving a network transfer request, the DTC 180 may determine, based at least on part on a network-related metric, such as bandwidth utilization data of one or more network paths 117, 118 and/or 115, a data transfer plan that includes one or more time windows during which some or all of the client's data can be transferred for a transfer rate or price that is less than or equal to a threshold rate or price which may have been specified by the client 148. The DTC may then provide a notification to the client for the first time window, informing the client of the start and end times and providing an authorization token that is to be used during the time window. The data transfer of at least a portion of the may then be initiated. The DTC may validate the data transfer based on when it was initiated (i.e., by checking that it is within a specified time window), and/or using the token that was provided in response to the network transfer request. For transfers that take more than one time window, a respective notification may be provided for each time window in some embodiments, and the transfer of respective partitions of the data set may be completed, until the entire data set reaches the destination. The durations of different time windows identified for a given transfer request may differ in some embodiments, as may the transfer pricing rates, based for example on bandwidth demand and supply over various links or paths 117, 118 and/or 115. In one embodiment the DTC 180 may be configured to validate that the entire data set has reached the specified destination without data corruption, and provide an indication to the client that the transfer has successfully been completed if no evidence of data corruption is found. For example a hash-based algorithm and/or a checksum of the entire data set may be used to validate the correctness of the data set at the destination.

In at least one embodiment, the DTC 180 may comprise one or more subcomponents, such as a pricing manager component 141, a network metrics analyzer 143, and/or an interface manager 145. The networks metrics analyzer 143 may be configured to obtain network usage metrics and history, e.g., from various metering agents within the provider network and or from records stored in bandwidth management database 191. The networks metrics analyzer 143 may use this data to estimate current bandwidth utilization for various network paths 117, 118 or 115, and may in some embodiments compute projections for expected future bandwidth use at various points in time using the gathered data. The results of the network metrics analysis may be usable by the DTC to identify time windows when network utilization is expected to be low, so that data transfers for clients 148 can be scheduled. The pricing manager 141 may keep track of pricing history for data transfer, and may use the pricing history, together with pricing policies of the provider network and the projections provided by the network metrics analyzer 143 to make pricing estimates or projections that the DTC 180 can use in generating its data transfer plans. In some embodiments a subset of pricing projections made by the pricing manager 141, and/or network bandwidth projections generated by network metrics analyzer 143, may be provided to clients 148. An interface manager 145 may be operable to implement various programmatic interfaces, such as web pages, APIs, GUIs, or command-line interfaces that can be used for client-DTC interactions as well as for data transfer operations in some embodiments. The various components of DTC 180 may all be implemented on a single computing device in some embodiments, and may be implemented using respective computing devices in other embodiments.

In one embodiment, the DTC may provide installable data transfer agents (DTAs) 167 for installation on client devices 160 or in client networks 150 (e.g., DTA 167A and 167B at client devices 160A and 160B respectively). A DTA 167 may perform a number of operations to facilitate the client's data transfers in such an embodiment, for example, on the sending or source side of a data transfer: partitioning the client's data set, generating checksums on the client's data, securing the data using encryption, de-duplicating the data, compressing the data, and so on. Similarly, when the client device 160 is the destination of a data transfer, the DTA 167 may perform operations such as collecting or collating the partitions received, verifying the validity of the data using checksums or hashes, decrypting the data, uncompressing the data, and so on. Some of these operations may be performed for the entire data set as a unit, others may be performed on individual partitions, and some operations may be performed at both the data set level and the partition level in some embodiments. DTAs 167 may also be responsible for receiving notifications (e.g., regarding upcoming time windows) from DTC 180 on behalf of the client, transmitting client requests and responses to the DTC 180, and various other types of operations. Clients may choose whether they wish to install DTAs 167 in some embodiments; for example, some clients may prefer to use APIs supported by the DTC 180 instead of using DTAs 167 to manage at least some of the DTA functions described above. In one embodiment a subcomponent or subcomponents of the DTC may be executed on the various resources 130 involved in a data transfer.

In some embodiments the DTC 180 may store some of the different types of information used to develop data transfer plans (e.g., various time windows to use for a given data transfer) in a persistent store such as bandwidth management database 191. The plans themselves may also be stored in the bandwidth management database 191 in some embodiments. The DTC 180 may impose data transfer size restrictions in some embodiments—e.g., the total amount of data transferable during a given time window may be limited, and/or the size of an individual data transfer may be limited. Attempts to exceed the specified limits may result in truncation or invalidation of the data transfer in some embodiments. In some embodiments, the DTC may support data transfers comprising multiple streams of data—e.g., N threads may be set up to receive respective data streams at the destination of the transfer, and N threads may be started up to transmit data from the sender. In some embodiments supporting parallel data transfers, different authorization tokens may be provided for each stream, while in other embodiments, the same token may be used for multiple streams. In one embodiment, the number of different parallel streams allowed may change from one time window to another.

Example Data Transfer Timeline

FIG. 2 illustrates an example of a data transfer that comprises multiple data transfer operations during a plurality of time windows, according to at least one embodiment. In the illustrated example, a client 148 indicates in a network transfer request that data set 205 is to be transmitted from a specified source to a specified destination. Graph 201 illustrates the variation in data transfer pricing rate (expressed in U.S. dollars per gigabyte) over time, and the time windows that are identified based on data price fluctuations. The Y-axis of graph 201 indicates the data transfer pricing rate, and the X-axis indicates time. The maximum pricing rate that the client 148 in this example is willing to pay for the transfer of data set 205 is shown by the dotted line 209. A dynamically varying data transfer pricing rate that may be applicable for data transfer between the source and destination is shown by the line 207. The dynamically varying pricing rate may be referred to herein as the "spot" pricing rate, or simply as the "spot" price for data transfer. As noted earlier, in some embodiments the time boundaries at which the prices change may be fixed by the provider network operator—e.g., a standard pricing rate may apply during 8am—10 pm and a discount pricing rate may apply between 10 pm and 8 am. In other embodiments, as in the illustrated example, the time boundaries may change from day to day based on current or anticipated network conditions. Similarly, in some embodiments the discounted and non-discounted pricing rates may be fixed, while in other embodiments such as the one illustrated in FIG. 2, the prices may vary dynamically over time.

During the time period T0 through T1, the spot price is higher than the $MM.mm that the client is willing to pay; as a result, no data is transferred for the client 148 during this time. Between times T1 and T2, however, and later, between times T3 and T4, the spot price falls below the client's maximum price; thus, in the illustrated example, two time windows are shown during which portions of data set 205 are transferred at a price acceptable to the client 148. In the first time window TW1 between T1 and T2, three partitions of the data set 205 termed "Chunk1", "Chunk2" and "Chunk3" are transferred. During the time period between T2 and T3, the spot price again rises above the limit specified by the client, so the transfer of data set 205 is paused or suspended. Between T3 and T4, during time window TW2, the transfer resumes again; this time, two addition partitions, "Chunk4" and "Chunk5", are transferred from the source to the destination. At the end of the time period covered by graph 201, there are still portions of the data set that remain to be transferred—e.g., "Chunk6" and "Chunk?".

In some embodiments, the same pricing rate may be applied for each of the time windows TW1 and TW2—e.g., the client 148 may be charged the maximum price 209 that the client is willing to pay (or a price slightly below the maximum). In other embodiments, the client may be charged the dynamically varying pricing rate 207, e.g., a different rate may be applied for each window. In some embodiments, the dynamic pricing rate 207 may itself be affected by the additional bandwidth usage in the time windows for various client requests—e.g., one factor contributing to the lower price during time window TW2 than time window TW1 may be that, based on lower demand for such time window-based transfers may exist during TW2 than during TW1. The pricing manager 141 may be responsible for adjusting the pricing rates in accordance with supply and demand in some embodiments.

In the illustrated embodiment, the data set is divided into partitions, not all of which may be the same size (e.g., Chunk7 may be smaller than Chunk6, for example). While the data set may be pre-partitioned as shown in FIG. 2 in some embodiments, e.g., partition sizes and/or boundaries may be determined before the first of the data transfer operations are initiated, in other embodiments the partitioning may be performed only when window notifications are received. For example, the partitioning of the remaining portion of the data set 205 into Chunk6 and Chunk7 may not be initiated until a corresponding time window becomes available in some embodiments. As in the illustrated embodiment, the number of partitions or corresponding data transfer operations in different time windows may vary. In some embodiments, the client 148 may change the maximum price they are willing to pay over time as well—e.g., as more and more data of data set 205 gets transferred, the client may modify their bid, which may in turn result in DTC 180 modifying its transfer plans for the remaining data.

As shown in graph 201, DTC 180 may be able to utilize "valleys" in the pricing graph (i.e., periods when the price is relatively low), which may typically coincided with periods of low bandwidth utilization by other clients of the provider network, to allow transfer of data set 205 at acceptable prices, while retaining the ability to throttle network usage as needed during "peaks" or periods of high price and utilization. In some environments, the provider network operator itself may be paying other network infrastructure providers for data transfer, e.g., in one pricing policy the provider network operator may be billed based on the $95^{th}$ percentile level of bandwidth usage to and from its data centers during a given month. In many cases, allowing data transfers similar to that shown in FIG. 2 during low-utilization time windows may not affect the $95^{th}$ percentile bandwidth usage value, so that the provider network operator may not incur any additional costs as a result of such data transfers. Especially in such environments, being able to monetize spare bandwidth capacity by matching low utilization valleys with low-cost data transfers, may help increase the provider network's revenue while also benefiting budget-conscious clients 148.

Example Elements of Network Transfer Requests

Figure 3:
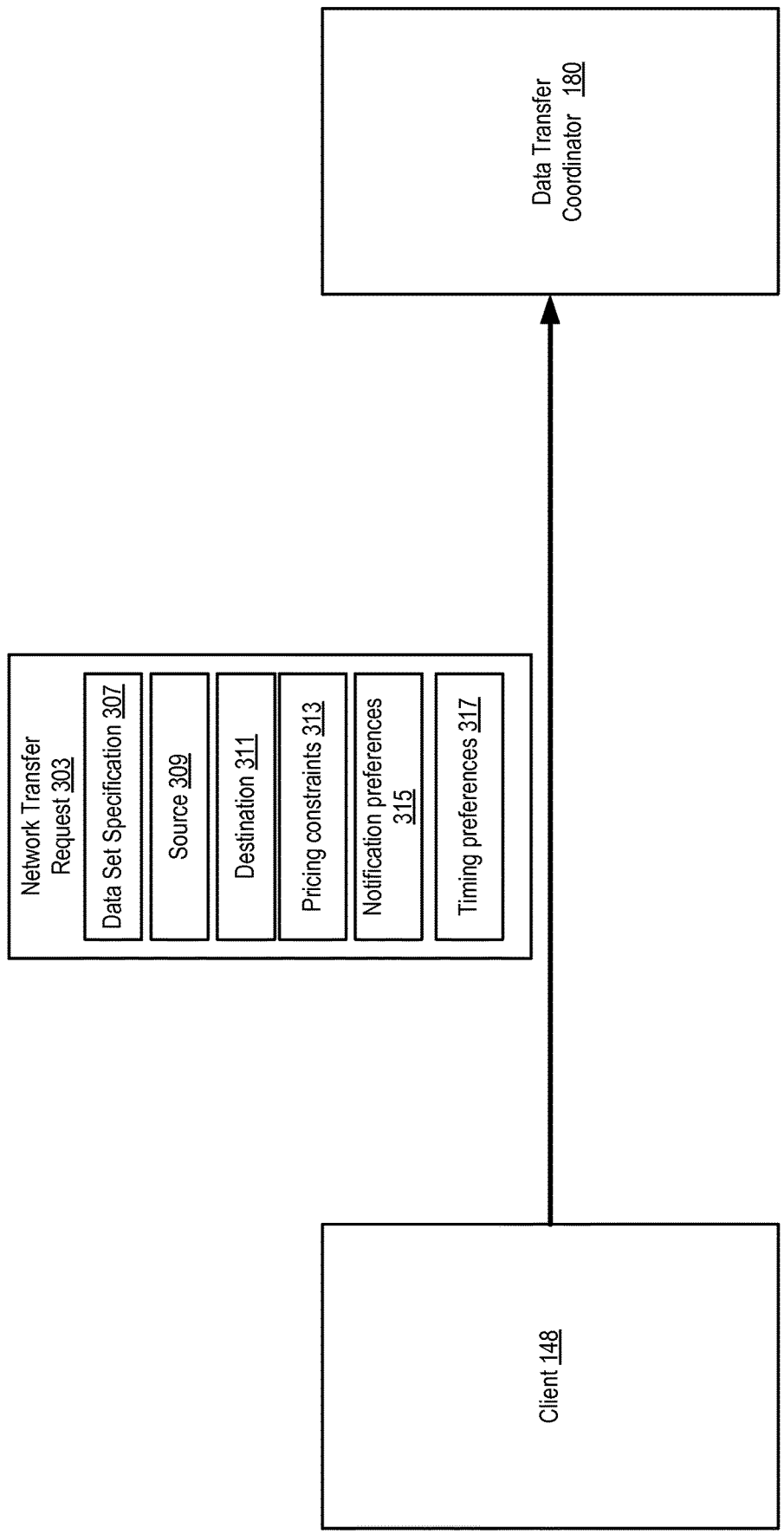
FIG. 3 illustrates example constituent elements of a data transfer request, according to at least some embodiments.

FIG. 3 illustrates example constituent elements of a network transfer request 303, according to at least some embodiments. As shown, the request 303 may comprise a specification 307 of the data set, which may comprise the names and/or paths of the files, folders, directories, file systems, storage drives or other devices where the data resides. The size of the data set may also be indicated in the specification in some embodiments. The network addresses of the source and desired destination of the data transfer may be indicated in respective elements 309 and 311, such as the names, identifiers, and/or Internet Protocol addresses of the host(s), resource instance(s), or virtual storage device(s). In some implementations the path or name of the destination directory or folder where the data is to be transferred may also be included. In one implementation the specification may indicate the location or address of the source and/or destination via one or more uniform resource locator (URLs) or uniform location indicators (URIs). The details supplied for source and destination addressing and location may vary for example based on the specific operating systems in use, the data transfer protocols used, and so on.

The pricing or cost constraints 313 of the client 148 with respect to the data transfer may also be included in the network transfer request 303 in some embodiments. Such constraints may be expressed in different terms or units in various embodiments: for example, as a maximum data transfer pricing rate the client 148 is willing to pay per unit of data transferred (e.g., expressed in units such as U.S. dollars per gigabyte), or a maximum price the client 148 is willing to pay for the entire transfer (e.g., expressed in U.S. dollars), in units based on peak bandwidth usage, percentile bandwidth usage, or using any other appropriate units. In some embodiments the network transfer request may include an indication of a notification preference 315 usable to determine the techniques to be used to inform the client 148 about time windows and/or tokens for the data transfer. For example, in embodiments where client-side data transfer agents 167 are supported and the client 148 has opted to install such a DTA 167, an indication of the DTA to be used for the requested transfer (such as a host/port combination, a URI or URL) may be provided. In some embodiments the client may indicate that notifications should be sent using a specified protocol, messaging system, social networking service (SNS) or queueing service, and may specify the target address to which the notifications should be sent.

In one embodiment the network transfer request 303 may include data transfer timing preferences 317 of the client 148. A timing preference could for example indicate a target deadline by which the client 148 would like the data transfer to be completed. In some implementations, the client 148 could also indicate preferred times of day or days of the week during which the transfer should be scheduled—for example, to avoid excess CPU or network load within the client's own network, the client may wish to transfer the data set during the night or on weekends. In some embodiments the client 148 may be able to indicate in the transfer request 303 which, if any, of the preferences are strict requirements ("must-haves"), and which, if any are not essential. In one embodiment, some of the preferences may depend on others—e.g., the client may indicate more than one pricing constraint, each tied to a different deadline or timing preference (the logical equivalent of: "If you can transfer this 10 petabyte dataset within one week, I am willing to pay $X; but if it takes two weeks, I am only willing to pay $Y"). Various other details about the network transfer, not shown in FIG. 3, may be included in the request 303 in other embodiments. For example in some embodiments a client may indicate one or more data transformation or preparation steps to be performed during the transfer, such as for example a preferred compression algorithm to be used, a preferred encryption algorithm to be used, and so on.

Example Elements of Transfer Time Window Notifications

Figure 4:
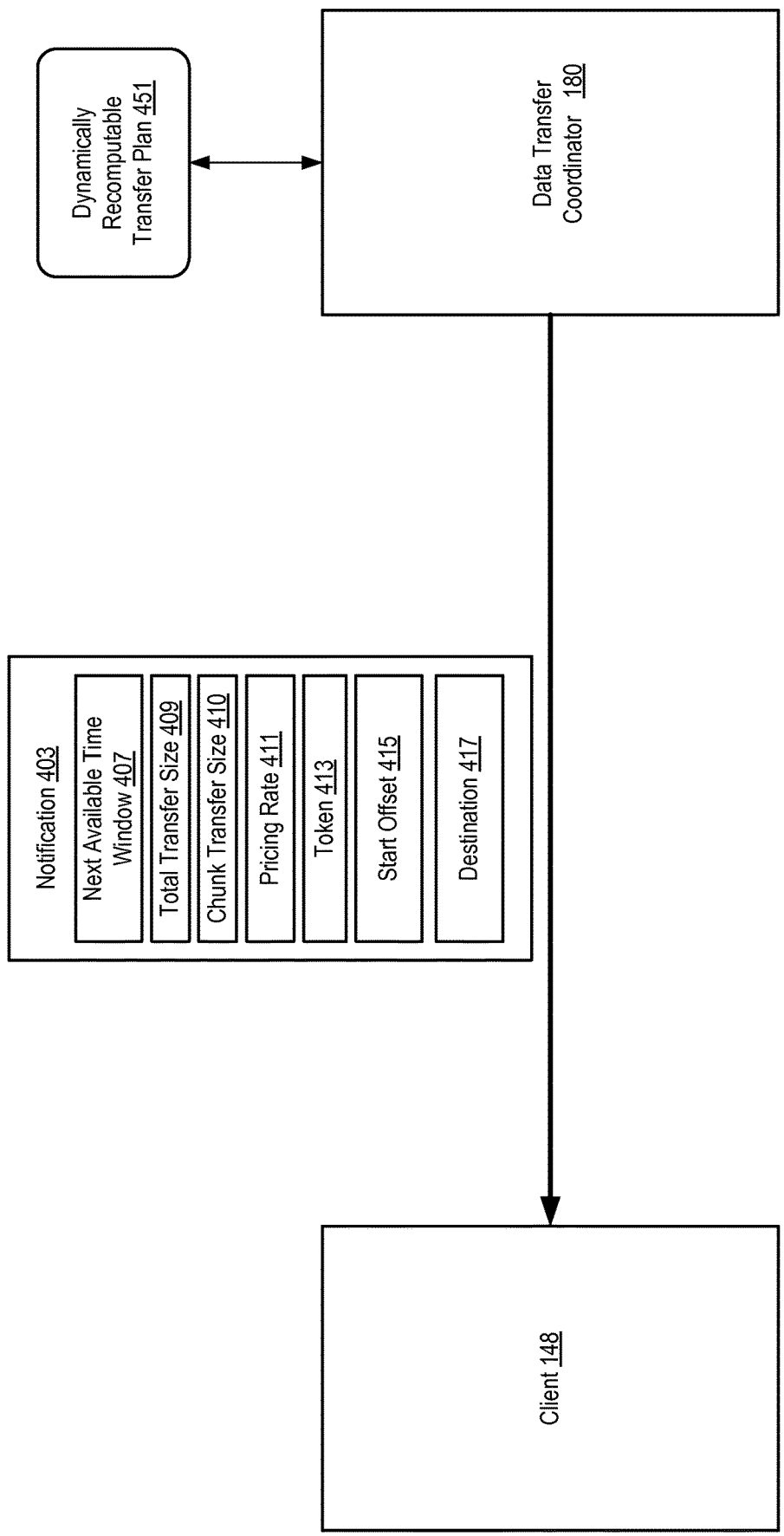
FIG. 4 illustrates example constituent elements of a transfer time window notification, according to at least some embodiments.

FIG. 4 illustrates example constituent elements of a transfer time window notification 403, according to at least some embodiments. In response to a network transfer request 303 from a client 148, a DTC 180 may generate a dynamically re-computable transfer plan 451, which includes at least one time window during which at least a portion of the data set is transferable for a transfer pricing rate that meets the client's pricing constraint 313. The DTC 180 may then notify the client 148 about the plan, e.g., by sending one or more notifications 403 that each contain details for a respective time window of the plan. In some implementations, a single notification 403 may be used to convey the details of all the time windows identified; in other implementations, respective notifications 403 may be provided for one time window at a time, or for a subset of the windows identified. In some embodiments the DTC 180 may be required to generate at least one feasible plan for transferring the entire data set, before notifying the requesting client regarding the first time window. In other embodiments, the DTC 180 may only need to identify one or a few time windows, not necessarily sufficient to transfer the entire data set, before notifying the client about the first time window. In the latter scenario, the DTC 180 not be able to provide assurances at the start of the data transfer as to when the entire data set may reach the destination; instead, the DTC 180 may simply make best-effort plans to transfer the data set as quickly as possible under the client's budget limits.

In the illustrated embodiment, the notification 403 comprises an element 407 indicating the start time and end time of the next time window available for the data transfer. The maximum amount of data that can be transferred during the time window may be indicated in total transfer size element 409. In the illustrated embodiment, the transfer is limited to operations with a partition size or chunk size indicated in element 410. For example, the total transfer size may be eight gigabytes for the specified time window, but individual transfer operations (such as FTP gets or puts) may be restricted to one gigabyte each, so that multiple transfer operations may be required to transfer the eight gigabytes. As noted earlier, such partitioning restrictions may allow the DTC to control the bandwidth usage of various network paths or links, and may also serve to limit the amount of data that may need to be retransmitted if a particular transfer operation fails.

The pricing rate 411 that the client 148 will be charged, applicable at least for the time window specified, may be included in the notification 403 in some embodiments. In some implementations an absolute pricing amount (e.g., expressed in U.S. dollars) may be specified instead of a pricing rate (e.g., expressed in dollars per megabyte). A token 413 granting authorization for the data transfer during the time window may be provided in some embodiments as part of the notification. In some embodiments the token, which may be encrypted or signed using any appropriate encryption mechanism such as various key-based mechanisms, may have a validity period that matches the time window, i.e., the token may expire at the end of the specified time window. In other embodiments, the token 413 may have a validity period that may last for several time windows. The validity of a token 413 may be extendable by the DTC 180 in some embodiments, e.g., in response to an extension request from a client 148, or in response to a detection of an impending token expiration by the DTC 180. For example, if the specified amount of data (e.g., the total transfer size 409 specified in the notification) has not yet been fully transmitted as the time window is about to end, and the DTC determines that the client should be allowed to complete the transfer at the agreed-upon pricing rate 411, the token validity period may be extended.

For some types of data transfers such as file transfers, the starting offset 415 of the next chunk or partition that the DTC 180 expects to be transferred may be indicated in the notification 403 in some embodiments. Such a starting offset 415 may serve as an acknowledgement of the amount of data that has been received thus far at the destination, for example. For the very first timing window of a data set, the starting offset may be specified as zero. In some implementations, a timing window notification may also indicate details of the destination 417 to which the data should be sent. For example, the client 148 may have specified the destination 311 in the data transfer request 303 as a host name; the notification 403 may include within destination element 417 the file system, folder or directory of the host where the data is to be sent.

For data transfers that require multiple time windows, as noted above, in some embodiments one notification 403 may be sent for each time window. In some implementations, the DTC 180 may review or re-compute its plans after each time window, and if changes are required to the initially-identified set of time windows, an updated notification or notifications 403 may be sent to the client 403. In some implementations, the transfer plan 451 may be generated one time window at a time—i.e., the DTC 180 may not plan out the whole transfer in response to the initial network transfer request 303. Instead, in such embodiments, the DTC 180 may only identify one (or a few) time windows at a time, sufficient to transfer a portion of the data set remaining at any given time.

Data Transfer/Acknowledgement Iterations

Figure 5:
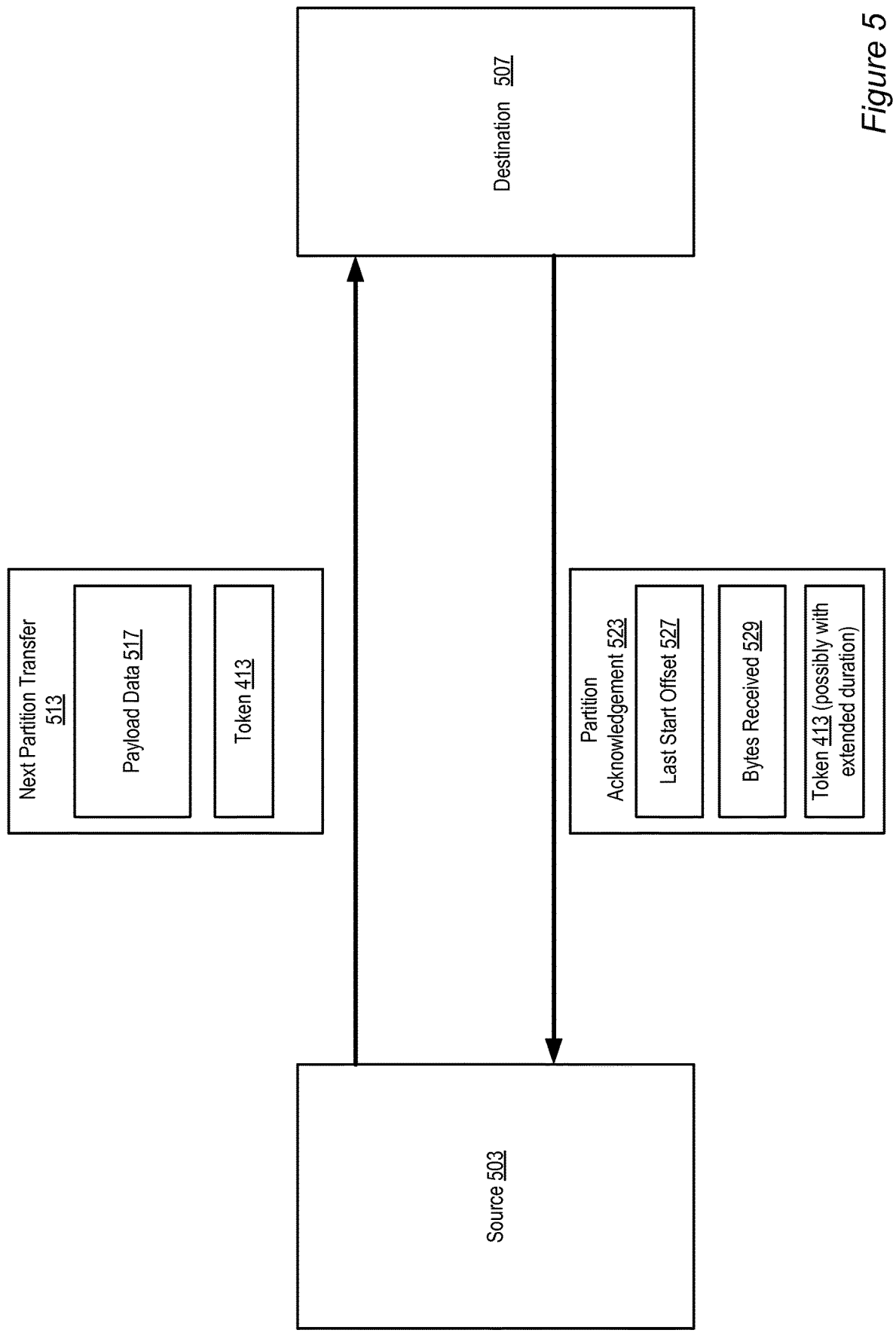
FIG. 5 illustrates an example data partition transfer and the corresponding acknowledgement, according to at least some embodiments.

FIG. 5 illustrates an example data partition transfer and the corresponding acknowledgement, according to at least some embodiments. In accordance with the time window start and end times specified in a notification 403, the transfer of at least a portion of the data set may be accomplished via one or more transfer/acknowledgement iterations; one such iteration is shown. The partition transfer 513 of a given iteration may include the transmission of a payload 517 comprising the data to be transferred from the source 503, as well as the token 413 that is to be used to validate the transfer. In some embodiments the token 413 may be sent in a separate message than the data payload 517. When the data is received at the destination 507, the token may be checked (e.g., using any appropriate key-based or other decryption methodology) to ensure that the transfer is authorized. In some embodiments a checksum or other data validation operation may sloe be performed at the destination 507 for each partition. If the token (or data) is found to be invalid, in some embodiments the DTC 180 may inform the client 148 on whose behalf the data is being transferred, and the data transfer may be abandoned, potentially allowing the DTC to schedule other data transfers during the remainder of the time window. If the token 413 and the data is found to be valid, a partition acknowledgement 523 may be sent in some embodiments. The acknowledgement 523 may indicate the last start offset 527 for which data was received successfully at the destination and the number of bytes 529 received in the last successful transfer. For example, if the partition transfer 513 payload data 517 began at offset 409600 bytes within the file being transferred, and 100000 bytes were successfully received at the destination, the corresponding acknowledgement 523 may indicate the last starting offset as 409600, and may indicate 100000 in the number of bytes field 529. In some embodiments the token 413 (possibly with an extended validity duration, if such an extension is needed) may also be included in the partition acknowledgement. In some implementations, a new token 413 may be supplied for each partition transfer.

As noted earlier, in some embodiments a client-side data transfer agent 167 may initiate data transmissions for the client, and may receive the acknowledgements 523 as shown in FIG. 5. In other embodiments, the client 148 may initiate the transfers using other mechanisms, e.g., via one or more APIs implemented by the DTC 180 or in accordance with standard data transfer protocols such as FTP. In some implementations, a component of the DTC may be installed and/or executed at various resources 130 of the provider network that are involved in data transfers of the kind illustrated in FIG. 5—e.g., one such component could coordinate the partitioning of the data set (and/or various other preparatory operations such as compression, encryption and the like) at a source resource 130, and another such component could coordinate destination operations at a destination resource 130 (e.g., receiving the data, checking the token and/or the data, generating and transmitting acknowledgements, and the like). In one embodiment a DTA 167 could be configured to perform either the sending side operations (e.g., partitioning, encrypting, and the like) or the receiving side operations (e.g., combing the partitions, decrypting, and the like), depending on the current role (source vs. destination) of the client device 160 where the DTA 167 runs.

Example Web-Based Interface for Transfer Requests

FIG. 6 illustrates a portion of an example web-based interface that may be implemented to allow clients to submit network transfer requests, according to some embodiments. As shown, the interface may comprise a web page 600 that includes a message area 603. A client 148 may use form field 605 to specify a description of the data transfer. Source and destination information for the data set, such as respective URLs, URIs, IP addresses, resource instance identifiers, storage instance identifiers, and the like, may be specified via field 605 for the source and field 607 for the destination. The type of data set, e.g., whether a single file is to be transferred or one or more file collections or directories are to be transferred, may be indicated via form field 611, which is shown with a default setting indicating that the object type is a file.

In some embodiments, the total data set size may be specified via form field 613. The pricing constraints for the data transfer may be specified via another form field 615, shown with a default value of $0.05 per gigabyte in the illustrated example. As noted earlier, other pricing units may be used in other embodiments, such as peak-transfer-rate based units, percentile-based units, and so on. A deadline or other timing constraints for the data transfer may be specified may be specified via field 617 in some embodiments. In some implementations, the client 148 may specify a preference for the transfer initiation mechanism to be used via field 619, e.g., indicating whether an installable agent such as a DTA 167 is to be used, or whether the client 148 intends to use APIs supported by the DTC 180. A notification mechanism preference for receiving time windows, tokens and the like may be indicated via field 621 in some embodiments.

In the illustrated embodiment, a client 148 may indicate a preferred data validation mechanism, e.g., via a form field 623, that is to be used to verify that the data set has reached the specified destination specified without being corrupted or damaged. In the example shown, a checksum mechanism is indicated as the default setting for validation. The client 148 may be able to specify encryption-related preferences via a field 625, which for example may provide a drop-down menu with the different encryption mechanisms supported by the DTC 180. In some implementations, the client 148 may also be allowed to specify parallelism preferences 627, which may for example indicate whether multiple streams of parallel data transfers should be attempted, and in some cases may allow the client specify the number of parallel streams the client would like. For example, based on the performance characteristics of the client's source device and/or network, the client may wish to allow at most two parallel streams of data transfer, and may indicate the desired parallelizability limit via field 627. In the example shown, the default parallelizability setting shown is "don't care", indicating that the client is willing to let the DTC 180 and/or the DTA 167 determine whether parallel data transfer streams are to be attempted, and if so, how many.

After a client submits a network transfer request 303 and one or more acceptable time windows for data transfer are found, in some embodiments the client 148 may allow the data set to be transferred in a fully or mostly automated manner, e.g., without requiring further interactions between the client 148 and the DTC 180 until the entire data set reaches the destination. Interactions between the sending and receiving entities of the data transfer (e.g., DTAs 167 at client devices and/or components of the DTC 180 at resources 130) may be programmatic, e.g., consisting of various APIs calls and/or callbacks that are not exposed to the client 148. In other embodiments, the client 148 may wish to be informed about the status of the data transfer as it proceeds, e.g., so that the client 148 is able to learn what fraction of the data remains to be transferred at any given time, whether any errors have been encountered, the price accumulated so far for the data transfer, and so on. In the illustrated embodiment, a client 148 may be allowed to provide preferences for human-readable notifications (which may be distinct from the time window notifications discussed above) during or related to the transfer via field 629 of FIG. 6. The example default value for field 629 indicates that the client wishes to receive a notification after every 1000 gigabytes of the data set is transferred, and also when the entire data set is successfully transferred. A click on the "Next" button 631 may take the client 148 to other portions of the web-based interface.

In some embodiments, a client 148 who wishes to specify different "what-if" scenarios may submit multiple network transfer requests, with different parameters and preferences specified, and receive respective execution plans and/or timing window notifications from the DTC 180. For example, in one embodiment the DTC 180 may return an estimated completion date for the entire data transfer at a client's request, based on the client's pricing constraint, and the client may obtain different deadlines for different budget limits before deciding which plan to accept. In another embodiment, the client may specify different deadlines and request the DTC 180 to provide quotes for completing the data transfer according to each deadline. Interfaces similar to that shown in FIG. 6 may be used by the client to specify the what-if scenarios in some embodiments.

Methods for Implementing Data Transfers

Figure 7:
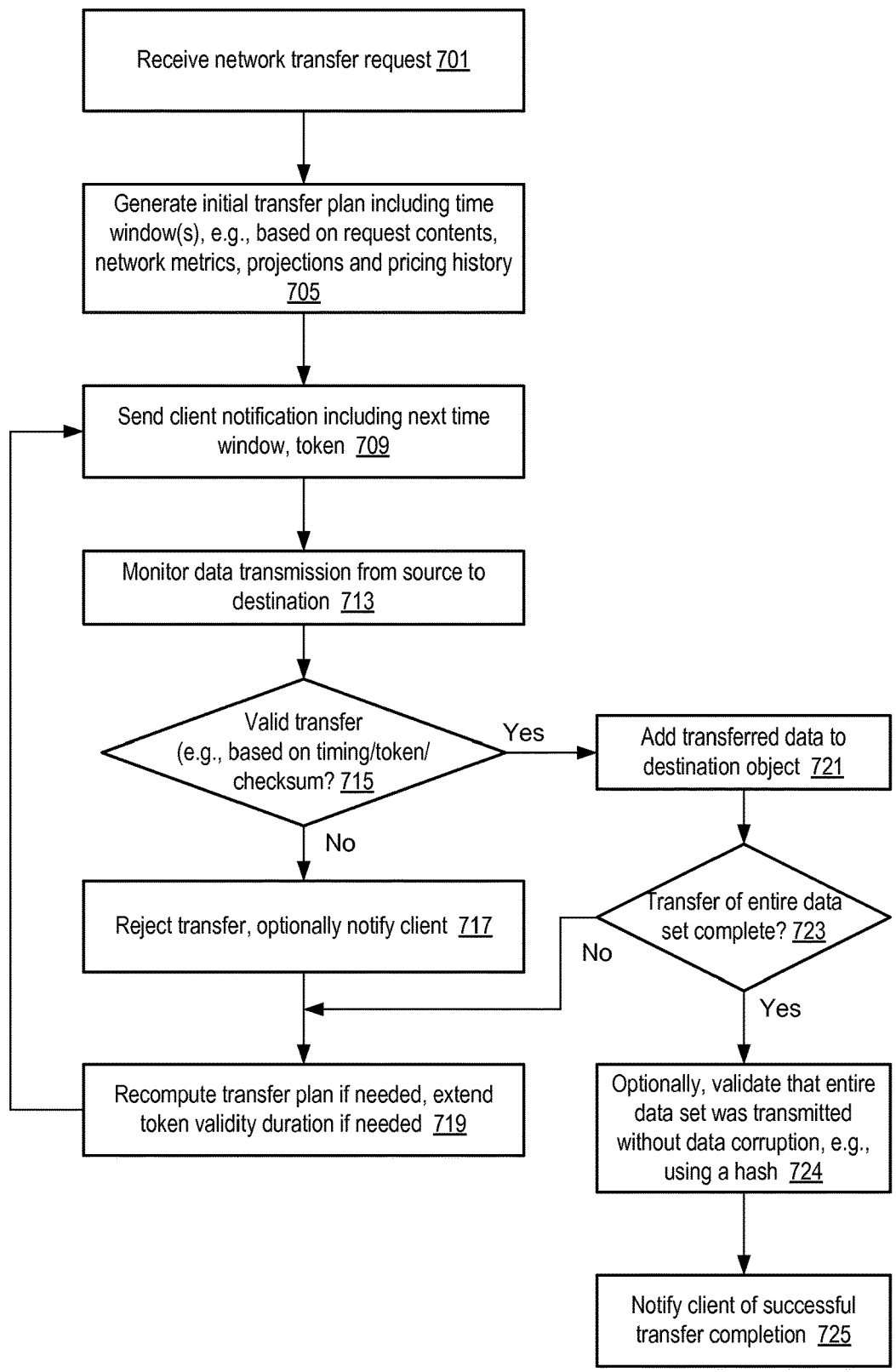
FIG. 7 is a flow diagram illustrating aspects of the functionality of a data transfer coordinator configured to support dynamic pricing for data transfers, according to at least some embodiments.

FIG. 7 is a flow diagram illustrating aspects of the functionality of a data transfer coordinator 180 configured to support dynamic pricing for data transfers, according to at least some embodiments. As shown in element 701, the DTC 180 may receive a network transfer request 303 for a transfer of a data set from a specified source device or location to a specified destination device or location. The request 303 may include various details of the transfer, such as the transfer type (e.g., individual file vs. collection of files vs. directory vs. file system), the total size of the data set, as well as various preferences and constraints similar to those illustrated in FIGS. 3 and 6. Based on the information in the request 303, and on any combination of other factors such as network-related metrics and/or projections of future bandwidth usage for one or more of the resources potentially involved in the transfer, bandwidth pricing history and/or projections, the DTC 180 may generate an initial data transfer plan 451 (element 705 of FIG. 7). The transfer plan 451 may include one or more time windows during which at least a portion of the data set is transferable at a pricing rate that meets the constraints specified by the requesting client 148.

The DTC 180 may then provide a notification to the client with information regarding the timing window (e.g., the start and end times of the window) and a token authorizing transfer of data at least during the time window (element 709). Various other constraints and/or restrictions may also be specified in the notification, such as a limit on individual transfer sizes and/or the total amount of data that can be transferred during the window. After providing the time window information, the DTC may monitor data transmissions from the specified source of the data transfer to the specified destination (element 713). When a give partition or chunk of data is received, the transfer may be validated based on one or more criteria—for example, based on the time that the transfer was initiated (i.e., whether the sender abided by the timing window specified), a token accompanying the data, or both the timing and the token. In some cases the data may also or instead be validated or checked for corruption using a checksum or similar mechanism. If the transfer is validated, as determined in element 715 of FIG. 7, the data may be added to a destination object of the transfer (such as a file or a directory), as indicated in element 721. If the data transfer is invalid, as also determined in element 715, the payload data may be rejected or dropped, and in some embodiments the client 148 may be notified that the transfer has failed (element 717)

After a valid data transfer, if the entire data set has been successfully transferred, as determined in element 723, the client may be notified of the completion of the data transfer (element 725). In some embodiments one or more data validation operations such as a hash computation or a checksum computation may optionally be performed on the entire data set (element 724) to verify that the data did not get corrupted. If more data remains to be transferred, or if the latest data transfer was found invalid, in the illustrated embodiment the data transfer plan may be recomputed if needed (element 719). In some cases a validity period associated with the token may also be extended to allow the data transfer to complete. Details of the next time window of the data transfer plan (which may have been recomputed, or may remain unchanged from the original plan) may then be provided to the client (element 709), and the process may be repeated for additional time windows until the entire data set transfer is completed. Each iteration of the data transfer loop may comprise an automated notification of a time window in some embodiments, followed by an automated data transfer. In some embodiments, the client 148 may request to be notified of the progress of the data transfer, or be provided access to transfer status information via a programmatic interface such as an API, web page or command-line tool. In some embodiments, clients 148 may request re-computations of the data transfer plan via such an interface.

Figure 8:
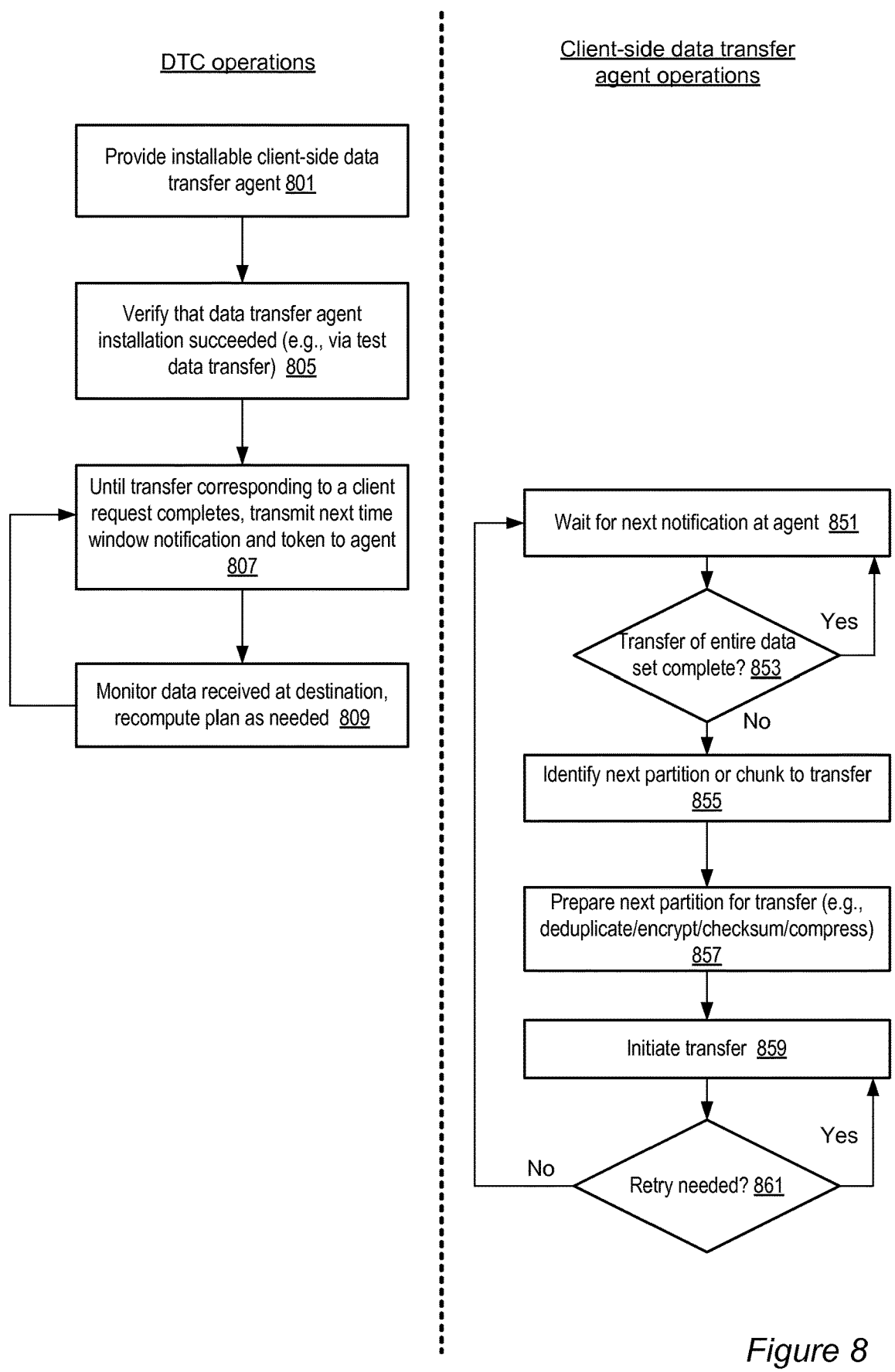
FIG. 8 is a flow diagram illustrating aspects of the functionality of a data transfer agent installable on a client device, according to at least some embodiments.

FIG. 8 is a flow diagram illustrating aspects of the functionality of a data transfer agent 167 installable on a client device, according to at least some embodiments. In FIG. 8, operations performed by the DTA 167 are shown to the right of the dotted line, and operations of the DTC 180 are shown on the left. The DTC 180 provides an installable client-side DTA to the client 148, as indicated by element 801. After the client installs and/or activated the DTA at one or more client devices (e.g., the hosts or devices from which the data set is to be transferred, or at which the data set is to be received), the DTC 180 may in some embodiments verify that the installation succeeded (element 805) and that the DTA 167 is functioning as expected. For example, in some embodiments the DTC 180 may perform one or more test data transfers to check the DTA's functionality. The DTC may then wait for a data transfer request 303 from the client 148. In response to such a request, the DTC 180 may transmit a series of time window notifications (and tokens) to the DTA 167 (as shown in element 807), until the entire data set has reached the intended destination. As successive portions of the data set reach the destination, the DTC 180 may monitor the data transmission, validate the portions transferred, and in some cases recomputed the transfer plan if needed (element 809).

After it is activated, the DTA 167 at a particular client device 160 involved in a data transfer from that device may wait for notifications (element 851). If a notification indicates that the data transfer currently under way is complete, as detected in element 853, the DTA 167 may resume waiting for an initial notification of a time window for a new data transfer request. In the data current data transfer is not yet complete (as also determined in element 853, in the illustrated embodiment the DTA 167 may identify the next partition or chunk of the data to transfer during the time window indicated in the notification (element 855). In some embodiments the notification may directly or indirectly indicate the boundaries of the next partition, e.g., based on transfer size and/or partition size limits, offsets and sizes of the successfully completed transfers, and so on.

The DTA 167 may then perform one or more operations on, or transformations of, the data of the partition (element 857). In various embodiments, the operations may include any combination of de-duplication (removal of duplicate data or files), encryption, checksum operations, compression and the like. The DTA 167 may then start the transfer of the data partition (element 859) to the destination, e.g., together with the appropriate authorization token received in the notification. If an error is encountered during the transmission, e.g., due to network congestion, as determined in element 861, the partition may be transmitted. In some cases the DTA may delay the attempted retransmission to avoid overburdening the network, e.g., using techniques similar in principle to those used at the packet level for TCP/IP. After a particular transfer succeeds, the DTA may wait for the next notification (element 851), until finally the entire data set has reached the destination.

In some embodiments, for data transfers in which the client device 160 is a destination the DTA 167 may also perform destination-side functions as needed, e.g., validating data transfers, sending acknowledgements, extending token validity periods and the like. In some implementations, a DTA 167 may be configured to generate a token for a data transfer. In environments where the client 148 does not wish to install a DTA on its devices, some or all of the DTA functionality shown in FIG. 8 may be implemented by the client using APIs provided by the DTC 180. In some embodiments, the client 148 may specify the specific set of partition preparation steps desired—e.g., some clients may not need the data to be encrypted, and may indicate this in their data transfer preferences.

Figure 9:
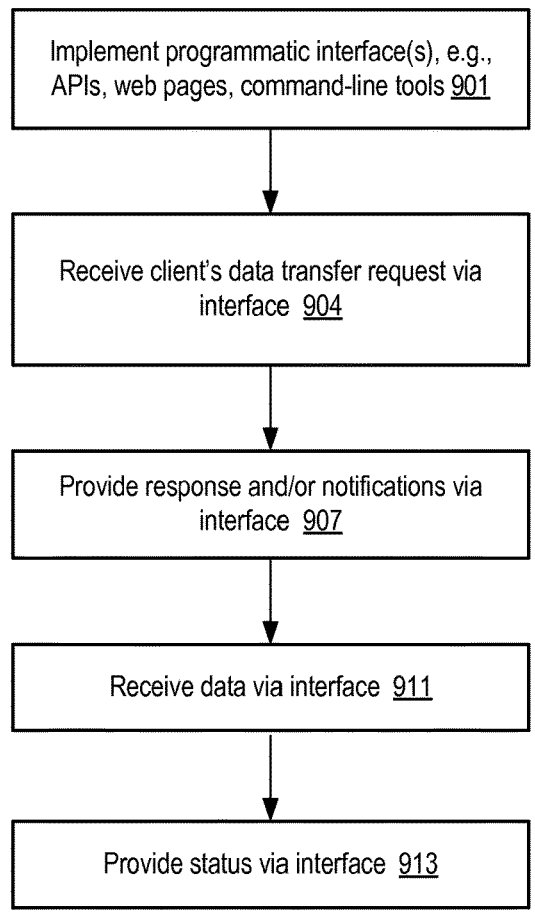
FIG. 9 is a flow diagram illustrating aspects of the functionality of a data transfer coordinator operable to implement one or more programmatic interfaces to support dynamic pricing and scheduling of data transfers, according to at least some embodiments.

FIG. 9 is a flow diagram illustrating aspects of the functionality of a DTC 180 operable to implement one or more programmatic interfaces to support dynamic pricing and scheduling of data transfers, according to at least some embodiments. As shown in element 901, the DTC may implement the one or more programmatic interfaces, such as web pages, GUIs, APIs, command-line tools, and the like, and make the interfaces accessible to the clients 148. The client's network data transfer request 148 may be received via one of the interfaces, as shown in element 904. A response and/or notification including for example the initial time window may also be provided using the same interface or one of the other supported interfaces (element 907).

The data transfers of various partitions (or all) of the data may themselves be performed using one of the interfaces in some embodiments (element 911). For example, in one embodiment a client 148 may be able to initiate data transfers using a web page that is accessible from the time window notification. Some of the interfaces may allow the client to obtain or view the current status of the data transfer (element 913), e.g., the fraction of the data that has been transferred so far, or the nature of any errors or exceptions encountered, and so on.

Figure 10:
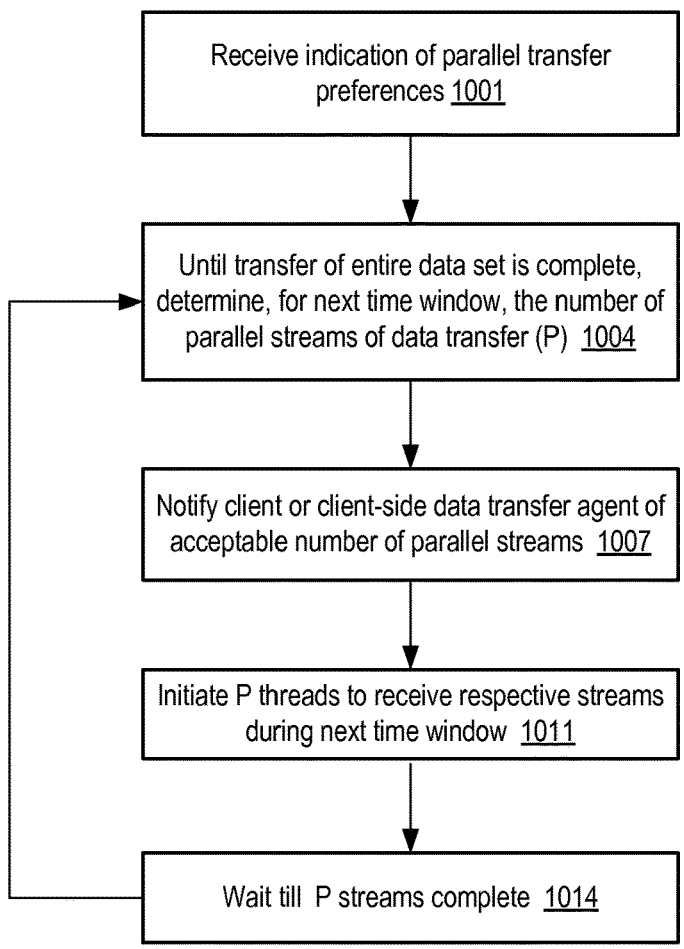
FIG. 10 is a flow diagram illustrating aspects of the functionality of a data transfer coordinator operable to support parallel streams of network data transfers, according to at least some embodiments.

FIG. 10 is a flow diagram illustrating aspects of the functionality of a DTC 180 operable to support parallel streams of network data transfers, according to at least some embodiments. As noted above, the client 148 may indicate its willingness to allow the DTC 180 to schedule parallel data transfer streams in some embodiments, e.g., using the parallelism preferences 627 shown in FIG. 6. In some embodiments the client 148 may specify a maximum number of parallel streams that the DTC 180 can schedule or implement at a given time, while in other embodiments the DTC 180 may be granted permission to implement as many parallel streams as it deems appropriate. The indication of the client's preferences regarding data transfer parallelism may be received by the DTC, as shown in element 1001. In some embodiments the DTC 180 may determine, for each time window, the number of parallel streams to use for the next timing window, as shown in element 1004. This decision may be based on various factors in different embodiments, such as limits indicated in the client preferences, the amount of data that remains to be transferred, the processing and/or networking capabilities of the sending and receiving devices, the current data transfer pricing in effect, the client's budget constraints, and so on. For example, the client may have specified a maximum acceptable pricing rate, and the number of parallel streams may be chosen such that the combined price of the parallel streams meets the client's constraint.

Having determined P, the number of parallel transfer streams to use, the DTC 180 may in some embodiments inform the client 148 and/or the DTA 167 (if a DTA is being used) how many streams are to be used (element 1007). In some embodiments the DTC 180 may specify the maximum number of streams it is willing to accept, and the client 148 or the DTA 167 may make the determination of the actual number of streams to use, up to the specified maximum number. The DTC 180 may then initiate or start up P threads to receive the respective P streams of data at the destination (element 1011) during the time window. The DTC 180 may then wait to receive the data via the P streams (element 1014), performing the various destination-side operations described earlier such as decrypting the data, validating the data (e.g., via checksums), uncompressing the data, and so forth. The DTC may then proceed to identify the next time window, and may repeat the operations illustrated in elements 1004, 1007, 1011 and 1014 until the entire data set is transmitted successfully. The number of parallel streams used in the different time windows of a given data transfer may differ, e.g., based on operational conditions. In some embodiments, respective authorization tokens may be provided to the sender for each parallel data stream, while in other embodiments, a single token may be usable for multiple streams.

It is noted that in some embodiments, the operations illustrated in FIGS. 7, 8, 9 and/or 10 may be performed in a different order than that shown, and that some of the operations illustrated may be omitted in other embodiments. For example, the determination of whether the entire data set has been transferred, shown in element 853 of FIG. 8, may be performed immediately after determining that a retry is not needed (element 861), instead of being implemented after a notification is received.

Example Use Cases

The techniques described above for dynamic pricing and scheduling of network data transfers may be useful in a wide variety of environments. As the size of application data sets grows, the cost of transferring the data sets may become an increasingly dominant factor in the total application cost. For clients that have limited budget, giving up some control on exactly when their data gets to its destination, in return for a lower total transfer cost, may be an acceptable tradeoff. Example clients that may benefit from this approach may include scientists and researchers interested in data analysis and simulations (e.g., for physics, astronomy, biology and the like), as well as search engine implementers, organizations interested in data mining, offline analysis of social media interactions and/or web usage logs, and the like.

The ability to cater to the needs for such data-intensive application users may be especially attractive to provider network operators whose own networking costs may not be impacted significantly by allowing the data transfers to proceed during valleys in network utilization. For example, in some cases, a provider network operator may be charged for bandwidth based on a $95^{th}$ or $90^{th}$ percentile usage rate: e.g., if the peak aggregated incoming or outgoing data transfer rate to a particular data center is N gigabytes per second, the bandwidth charge may be based on 0.95*N or 0.9*N. Thus, the pricing may be dependent on peak bandwidth usage, and increasing the bandwidth used during periods of relatively low utilization may not affect the overall bill. Thus, by dynamically scheduling portions of large data transfers during such periods when the network utilization would otherwise be low, the provider network operator may be able to increase revenues while keeping its own bandwidth costs under control.

Illustrative Computing Device

Figure 11:
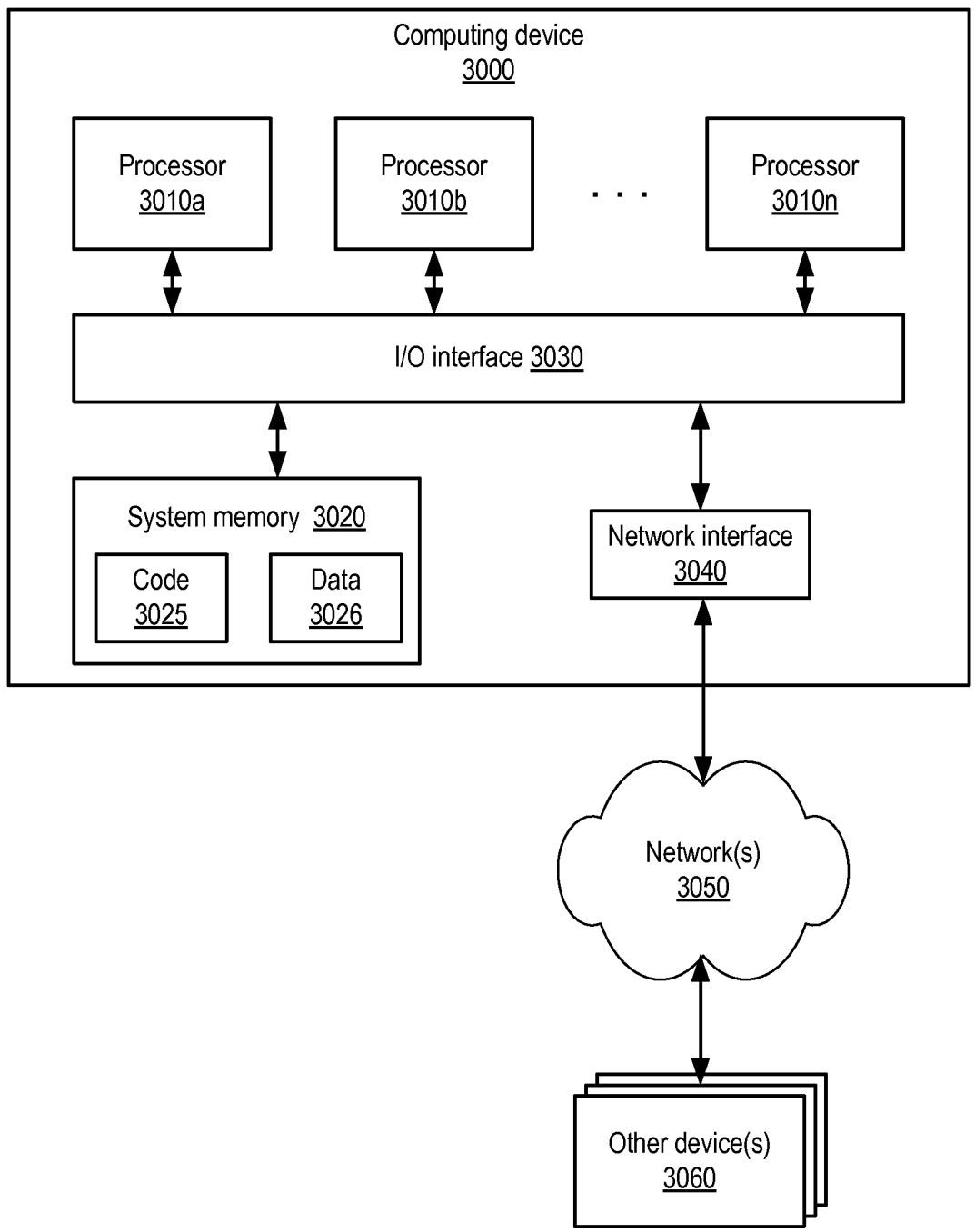
FIG. 11 is a block diagram illustrating an example computing device that may be used in some embodiments.

In at least some embodiments, a server that implements a portion or all of one or more of the technologies described herein, including the techniques to implement the functionality of various components of DTC 180 and/or DTAs 167, may include a computing device such as a general-purpose computer system that includes or is configured to access one or more computer-accessible media. FIG. 11 illustrates such a general-purpose computing device 3000. In some embodiments several components of DTC 180, such as pricing manager 141, networks metrics analyzer 143, and interface manager 145, may be implemented using a single computing device 3000, and in other embodiments each component or a subset of the components may be implemented using a respective computing device 3000. Various resources 130 of the provider network 110 may also be implemented using computing devices 3000 in some embodiments. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 10, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computer servers comprising a plurality of respective processors and memories, configured to implement a plurality of network-accessible resources of a provider network; and
a computing device comprising a processor and a memory storing program instructions for a data transfer coordinator, wherein the program instructions, when executed on or across the processor, cause the processor to:
provide a data transfer agent, from the data transfer coordinator, to a client device, wherein when the data transfer agent is executed by the client device, the data transfer agent causes the client device to prepare at least a portion of a data set for network transfer and initiate a network transmission of the at least a portion of the data set from the client device to one or more resources of the plurality of network-accessible resources;
in response to receiving a client request for the network transmission, from the data transfer agent of the client device, determine one or more time windows based at least in part on current bandwidth utilization and projected bandwidth utilization of the one or more resources and a timing constraint indicated in the client request;
provide, to the data transfer agent of the client device, a notification indicating a particular time window of the one or more time windows, wherein the notification indicates that the particular time window satisfies the timing constraint, and wherein the notification indicates a maximum amount of data transferrable during the particular time window;
provide, to the data transfer agent of the client device, a duration-limited token authorizing transfer of the at least a portion of the data set during the particular time window, wherein the duration-limited token has an expiration time corresponding to an end time of the particular time window;
determine the network transmission was initiated by the data transfer agent of the client device;
validate the network transmission based at least in part on a determination that the network transmission was initiated during the particular time window, and based at least in part on a determination the duration-limited token is valid for initiating the network transmission during the particular time window;

determine whether the network transmission includes a transmission of an amount of data that exceeds the maximum amount of data transferrable during the particular time window; and based on a determination that the network transmission includes the transmission of the amount of data that exceeds the maximum amount of data transferrable during the particular time window, invalidate a portion of the data that is in excess of the maximum amount of data transferrable.

2. The system as recited in claim 1, wherein the memory further comprises instructions that, when executed on or across the one or more processors, cause the one or more processors to:

determine the maximum amount of data transferable in the particular time window based on the timing constraint.

3. The system as recited in claim 1, wherein the projected bandwidth utilization is based at least in part on utilization measurements of one or more network links reachable from the one or more resources.

4. The system as recited in claim 1, wherein at least a portion of the data set is transferable for a transfer pricing rate during the one or more time windows, wherein the one or more timing windows satisfy a pricing constraint includes a pricing threshold for the transfer pricing rate, wherein the transfer pricing rate is based at least in part on a measurement of client demand for network transfers, and at least in part on a measurement of available bandwidth on one or more network links reachable from the one or more resources.

5. The system as recited in claim 1, wherein the memory further comprises instructions that, when executed on or across the one or more processors, cause the one or more processors to:

implement a programmatic interface configured to receive the client request, wherein the programmatic interface includes one or more data fields configured to receive the timing constraint.

6. The system as recited in claim 1, wherein the memory further comprises instructions that, when executed on or across the one or more processors, cause the one or more processors to:

detect an impeding expiration of the duration-limited token;

determine that the network transmission is incomplete at the end time of the particular time window; and extend the expiration time of the duration-limited token based on a determination that the network transmission is incomplete.

7. A method, comprising:

providing, from a data transfer coordinator implemented by a computing device comprising a processor and a memory, a data transfer agent to a client device, wherein when the data transfer agent is executed by the client device, the data transfer agent causes the client device to initiate a network transmission of at least a portion of a data set from the client device to one or more resources of a plurality of network-accessible resources of a provider network;

in response to receiving a client request for the network transmission, from the client device, determining, by the computing device, based at least in part on current bandwidth utilization and projected bandwidth utilization of the one or more resources and a timing constraint indicated in the client request, one or more time windows;

providing, to the data transfer agent of the client device, a notification indicating a particular time window of the one or more time windows, wherein the notification indicates that the particular time window satisfies the timing constraint, and wherein the notification indicates a maximum amount of data transferrable during the particular time window;

providing, to the data transfer agent of the client device, a token authorizing transfer of the at least a portion of the data set, wherein the token indicates that the transfer is authorized during the particular time window;

determining the network transmission was initiated by the data transfer agent of the client device;

validating the network transmission based at least in part on a determination that the network transmission was initiated during the particular time window, and based at least in part on a determination the token is valid for the initiation of the network transmission during the particular time window;

determining whether the network transmission includes a transmission of an amount of data that exceeds the maximum amount of data transferrable during the particular time window; and based on a determination that the network transmission includes the transmission of the amount of data that exceeds the maximum amount of data transferrable during the particular time window, invalidating the amount of data that exceeds the maximum amount of data transferrable.

8. The method as recited in claim 7, further comprising:

determining the maximum amount of data transferable in the particular time window based on the timing constraint.

9. The method as recited in claim 7, wherein the projected bandwidth utilization is based at least in part on utilization measurements of one or more network links reachable from the one or more resources.

10. The method as recited in claim 7, further comprising determining a transfer pricing rate based at least in part on a measurement of client demand for network transfers, and at least in part on a measurement of available bandwidth on one or more network links reachable from the one or more resources, wherein the one or more time windows satisfy a pricing constraint includes a pricing threshold for the transfer pricing rate.

11. The method as recited in claim 7, further comprising:

implementing a programmatic interface; and receiving the client request via the interface.

12. The method as recited in claim 7, further comprising:

initiating, to the client device, a test network transfer to verify functionality of the data transfer agent at the client device.

13. The method as recited in claim 7, wherein the client request for the network transfer of the data set specifies a first resource of the plurality of network-accessible resources as a source of the transfer and a second resource of the plurality of network-accessible resources as a destination of the transfer.

14. The method as recited in claim 7, further comprising, prior to providing the notification, encrypting the token in accordance with a key-based encryption protocol.

15. The method as recited in claim 7, further comprising:

prior to providing the token to the client device, setting an associated expiration time of the token in accordance with the particular time window.

16. The method as recited in claim 15, further comprising:
    determining whether the transfer of the at least a portion of the data set has been completed at the expiration time of the token; and
    in response to a determination that the transfer of the at least the portion of the data set has not been completed, determining whether to change the expiration time of the token based at least in part on a currently applicable transfer pricing rate.

17. A non-transitory computer-accessible storage medium storing program instructions that, when executed on one or more processors, cause the one or more processors to perform the following actions:
    provide a data transfer agent to a client device, wherein when the data transfer agent is executed by at least one processor of the client device, the data transfer agent causes the client device to initiate a network transmission of at least a portion of a data set from the client device to one or more resources of a plurality of network-accessible resources of a provider network;
    in response to receiving, from the data transfer agent, a client request for the network transmission of the at least a portion of the data set, determine, based at least in part on current bandwidth utilization and projected bandwidth utilization of the one or more resources and a timing constraint indicated in the client request, one or more time windows;
    provide, to the data transfer agent of the client device, a notification indicating a particular time window of the one or more time windows and a token authorizing transfer of the at least a portion of the data set during the particular time window, wherein the notification indicates that the particular time window satisfies the timing constraint, and wherein the notification indicates a maximum amount of data transferrable during the particular time window;
    determine the network transmission was initiated by the data transfer agent of the client device;
    validate the network transmission based at least in part on a determination that the network transmission was initiated during the particular time window, and based at least in part on a determination the token is valid for attempting the network transmission during the particular time window;
    determine whether the network transmission includes a transmission of an amount of data that exceeds the maximum amount of data transferrable during the particular time window; and
    based on a determination that the network transmission includes the transmission of the amount of data that exceeds the maximum amount of data transferrable during the particular time window, invalidate the amount of data that exceeds the maximum amount of data transferrable.

18. The storage medium as recited in claim 17, wherein the instructions when executed on the one or more processors, cause the one or more processors to perform the following actions:
    determine the maximum amount of data transferable in the particular time window based on the timing constraint.

19. The storage medium as recited in claim 17, wherein the projected bandwidth utilization is based at least in part on utilization measurements of one or more network links reachable from the one or more resources.

20. The storage medium as recited in claim 17, wherein the instructions, when executed on the one or more processors, cause the one or more processors to perform the following action:
    determine whether the one or more time windows satisfy the timing constraint based at least in part on a measurement of client demand for network transfers, and at least in part on a measurement of available bandwidth on one or more network links reachable from the one or more resources.

21. The storage medium as recited in claim 17, wherein the client request is received via a programmatic interface configured to receive requests for network transfers.

22. The storage medium as recited in claim 17, wherein the instructions, when executed on the one or more processors, cause the one or more processors to perform the following actions:
    initiate a test data transfer to the data transfer agent of the client device to verify functionality of the data transfer agent of the client device.

23. The storage medium as recited in claim 17, wherein providing the notification indicating the particular time window comprises formatting the notification according to a selection of a notification protocol received from the client device via a programmatic interface.

24. The storage medium as recited in claim 17, wherein the instructions, when executed on the one or more processors, cause the one or more processors to perform the following actions:
    in response to an input from the client device, initiate transfer of the at least a portion of the data set using the token and in accordance with the particular time window.

25. The storage medium as recited in claim 17, wherein the one or more time windows include a first time window during which a plurality of streams of data from the data set are transferable in parallel, wherein the first time window satisfies the timing constraint, and wherein the instructions, when executed on the one or more processors, cause the one or more processors to perform the following actions:
    provide, to the client device, a parallel transfer notification indicating the first time window and a parallel transfer token authorizing parallel transfer of the plurality of streams; and
    determine whether a network transmission of a stream of the plurality of streams is valid based at least in part on a use of the parallel transfer token.

26. The storage medium as recited in claim 17, wherein the instructions, when executed on the one or more processors, cause the one or more processors to perform the following actions:
    determine, based on a result of one or more data validation operations, whether the data set reached a destination specified in the client request without data corruption; and
    in response to determining that the data set reached the destination without data corruption, provide an indication to the client device of a successful transmission of the data set.

* * * * *